United States Patent [19]

Thomas et al.

[11] 4,430,981
[45] Feb. 14, 1984

[54] TEMPERATURE RESPONSIVE AIR INDUCTION APPARATUS

[75] Inventors: J. H. Thomas; S. Azzopardi, both of Glamorgan, Wales

[73] Assignee: Fram Europe Limited, United Kingdom

[21] Appl. No.: 348,637

[22] Filed: Feb. 16, 1982

[30] Foreign Application Priority Data

Feb. 17, 1981 [GB] United Kingdom ............... 8104995

[51] Int. Cl.³ .................................. F02M 31/00
[52] U.S. Cl. .................................. 123/556; 123/552
[58] Field of Search .................. 123/552, 556; 236/13

[56] References Cited

U.S. PATENT DOCUMENTS 3,563,007  2/1971  Clarke .......................... 123/556
4,161,930  7/1979  Bendig et al. .................. 123/556 X

FOREIGN PATENT DOCUMENTS 2522557 12/1976 Fed. Rep. of Germany .
2624210  4/1978 Fed. Rep. of Germany .
2855198  4/1980 Fed. Rep. of Germany ...... 123/556
2114750  6/1972 France .
2001387  1/1979 United Kingdom .

Primary Examiner—William A. Cuchinski, Jr.
Attorney, Agent, or Firm—Markell Seitzman; Russel C. Wells

[57] ABSTRACT

In an air induction apparatus for the carburettor of an internal combustion engine the temperature of air flow into an air filter is controlled by a flap to meter the amount of heated air which is mixed with cold air, the control thereof being by a temperature sensitive vacuum control element and in order to prevent icing under full throttle low vacuum conditions a bimetal element is arranged edge-on in the intake air flow path to prevent complete reclosure of the flap for less than a predetermined in-flow air temperature.

3 Claims, 4 Drawing Figures

U.S. Patent
Feb. 14, 1984
4,430,981
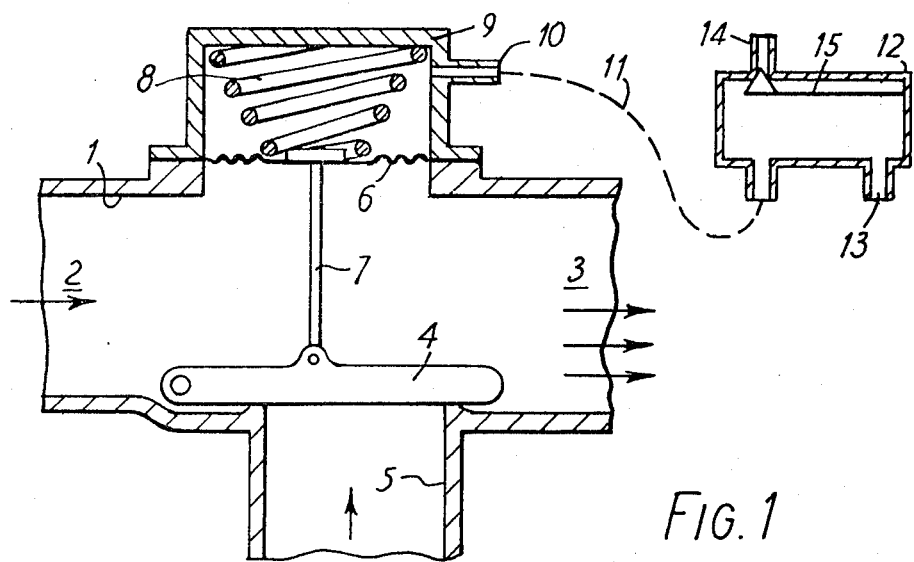
FIG. 1
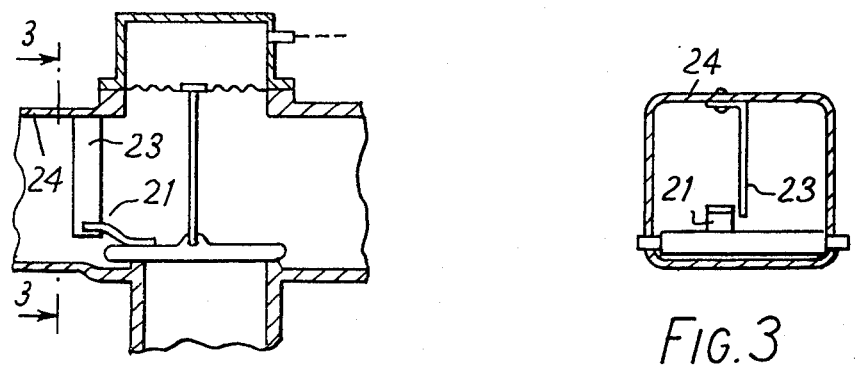
FIG 2
FIG. 3
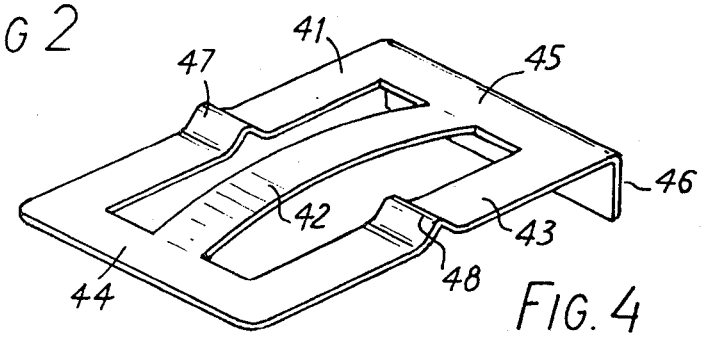
FIG. 4

TEMPERATURE RESPONSIVE AIR INDUCTION APPARATUS

This invention relates to temperature responsive air induction apparatus especially for internal combustion engines.

The regulation of induction air temperatures to internal combustion engines is a widely used means of controlling exhaust gas emission and optimising the efficiency of combustion. In one known system, a temperature-sensitive valve operated by a bi-metal element controls a vacuum applied to a diaphragm device for controlling a flap valve which adjusts a mixture of cool air and air heated by exhaust manifold to obtain a predetermined mean air temperature to the filter and carburettor inlet of an internal combustion engine. As the temperature of air controlling the bi-metal element increases, the flap valve moves to permit a reduced quantity of heated air to the carburretor.

One problem with such an arrangement can be that the temperature sensitive element is one which normally controls a vacuum to control the flap, whereas with a normal carburetor at full throttle the available vacuum tends to disappear almost completely. The control flap therefore tends to close for full throttle openings thereby preventing the desired inflow of hot air and this can result in freezing within the carburettor in adverse conditions.

The object of the present invention is to reduce the above short-coming.

According to the invention there is provided a temperature responsive air induction apparatus comprising an air induction duct operable to conduct induction air from a source of relatively unheated air towards temperature sensitive means, said duct including a temperature dependent vacuum responsive air control member operable to adjust a way through for admission of relatively heated air for admixture with the unheated air and characterised by a bi-metal element arranged edge-on to the flow in the air flow path to act as a stop to prevent complete reclosure of the member across the way through for the heated air when the unheated air temperature is below a certain value.

If desired the bi-metal element may be a snap-action element.

In order that the invention may be more clearly understood, the same will be further described by way of example with reference to the accompanying drawings in which FIG. 1 illustrates in diagrammatical form part of a known carburettor air induction system for an internal combustion engine, FIGS. 2 and 3 illustrates a modification of the apparatus of FIG. 1, in accordance with one embodiment of the invention.

FIG. 4 illustrates a snap-action element for use in accordance with a second embodiment.

Referring to FIG. 1, this shows a portion of an induction system for a carburettor of an internal combustion engine. The main flow path for air to the filter and subsequently to the carburettor is provided by a duct part of which is represented by reference 1 with an inflow end 2 and outflow end 3. The duct also includes a temperature-controlled pivotted flap 4 which in this prior art arrangement covers a hot air inlet passage 5, the flap 4 being controlled by a vacuum operable diaphragm 6 via a rod 7. The diaphragm 6 is normally biassed to hold the flap 4 in the closed position by virtue of a spring 8 captive in a diaphragm chamber 9. The diaphragm chamber 9 has a port 10 which is connected by a typically flexible plastics suction tube represented by the dotted line 11 to a temperature sensitive bi-metal controlled vacuum valve unit 12. The unit 12 has a vacuum connection 13 for connection to a vacuum port on the carburettor of the engine and a vent port 14 the flow path to which is closeable by a temperature sensitive bi-metal valve 15.

In operation of this prior art arrangement, the temperature sensitive bi-metal valve 15 controls the vacuum applied to the vacuum chamber 9 which in turn controls the position of the pivotted flap 4 thereby adjusting the ratio of cool air entering via the port 2 and warm air entering via the passage 5 to obtain a predetermined mean air temperature at the carburettor inlet. With the temperature senstive valve unit 12 located, as it normally is, within the air filter to the carburettor, the bi-metal valve opens when heated to allow a bleed of air from the vent 14 to thereby decrease the vacuum applied to the diaphragm chamber and the control flap therefore moves downward to reduce the flow of heated air and to increase the flow of unheated air. The temperature of air to the carburettor consequently tends to decrease and the bi-metal valve 15 when sensing such a decrease tends to move towards its seat to thereby increase the vacuum to the vacuum chamber 9 and lift the flap 4 to compensate for any undesired temperature decrease.

Under steady running conditions, an equilibrium condition for the flap 4 is therefore establishable to maintain a predetermined mean carburettor input temperature. However, as foreshadowed above, a system such as that shown in FIG. 1 can have a disadvantage to the extent that at full throttle settings, the vacuum which is provided at the port 13 of the unit 12 can substantially disappear with the result that the flap 4 closes regardless of the temperature of air flowing to the carburettor. This can result in carburettor freezing and engine malfunction or failure.

Referring to FIGS. 2 and 3, the latter being a view over section AA in FIG. 2, a detent 21 is attached to the pivotted flap 4 such as to be engageable with a bi-metal strip 23 when deflected towards it. As seen in FIG. 3, the bi-metal strip 23 is mounted on the upper surface 24 of the input duct such that in the event of the temperature of air flowing through the duct 1 falling below a given level the bi-metal 23 deflects leftwards so that the end thereof is engageable with the upper service of the detent 21 when the flap 4 tends to move towards the closed position. It is therefore seen that for a given predetermined low temperature of air in the duct 1, the flap 4, once having been open due to normal carburretor suction whilst moving towards a full throttle condition, cannot return to its fully closed position and thereby provides a predetermined way-through for heated air in the event of the unheated air being at less than said predetermined temperature. If the incoming air temperature increases, the bi-metal strip is deflectable rightwards in FIG. 3, thereby permitting the flap 4 to reclose passage 5 under control of the bi-metal vacuum valve and the system operates in a normal manner for induction air temperature and exhaust emission control.

In the foregoing, the temperature sensitive means for ensuring a way-through for heated air in the event of incoming air tending to be less than a predetermined temperature, operates in response to the temperature of incoming air flowing past it. This is regarded as the simplest way of achieving the desired result but the means for ensuring a predetermined way through may alternatively be controlled by means directly dependent upon the temperature of air flowing out of the end 3 of the duct. In other words, the control may be achieved by sensing unheated air temperature as a function of the temperature of air entering the carburettor.

In the arrangements described in the foregoing, adjustment of the position of the bi-metal strip 23 in relation to the detent 21 can be rather critical and for quantity production this is therefore something which may preferably be avoided. Referring now to FIG. 4, this shows a bi-metal element formed with three limbs and arranged to give a snap-action. If the element 23 of FIGS. 2 and 3 is replaced with the element of FIG. 4 it will switch with a snap action from a position which is clear of the detent 21 to a position where it is engaged by the detent 2 when the incoming air temperature falls below a set value.

The element of FIG. 4, comprises three distinct limbs 41, 42 and 43 joined at one end by a section 44 and at the other end by a section 45 with a mounting flange 46. The central limb 42 is bi-metal and has a curvature imparted to it by virtue of crimps 47 and 48 in limbs 41 and 43. The curvature of limb 42 at below a critical temperature is in the same sense as the crimps as shown. However, at more normal temperatures the curvature is in the other sense.

If the element shown in FIG. 4 is substituted for the strip 23 of FIGS. 2 and 3, because the amount of movement of the lower end section 44 at critical snap-over temperature is appreciable, positioning of this element is less critical than that of element 23.

We claim:

1. A temperature responsive air induction apparatus comprising an air induction duct (2) operable to conduct induction air from a source of relatively unheated air, an inlet duct (5) joined to said induction duct (2) operable to conduct heated air into said induction duct and mix with the relatively unheated air, the juncture of said inlet duct with said induction duct forming an annular seating surface, a temperature dependent vacuum control member (6, 7, 4 . . . 15, 23) operable to control the flow of heated air from said inlet duct into said induction duct, said control member including:
    a flap (4) hinged at one end, upstream of the juncture of said induction duct and said inlet duct, said flap including a flat undersurface adapted to seat upon said annular seating surface and including another hinge located proximate the middle of said flap, opposite said undersurface for receiving a bar (7) extending from a vaccum operable diaphragm and a detent (21) positioned on said one end and including a cantilevered end extending upstream therefrom; and
    a flat bi-metal element having side portions and arranged such that an edge of the side portions is edge-on to the flow of unheated air, said element extending downwardly within said induction duct such that a side portion is adjacent to and extends below said cantilevered end of said detent, said element movable in a lateral manner in response to the temperature of the unheated air to engage said detent to apply force to said cantilevered end to prevent complete reclosure of said flap when the unheated air temperature is below a predetermined value.

2. A temperature responsive air induction apparatus comprising an air induction duct (2) operable to conduct induction air from a source of relatively unheated air, an inlet duct (5) joined to said induction duct (2) operable to conduct heated air into said induction duct and mix with the relatively unheated air, the juncture of said inlet duct with said induction duct forming an annular seating surface, a temperature dependent vacuum control member (6, 7, 4 . . . 15, 23) operable to control the flow of heated air from said inlet duct into said induction duct, said control member including:
    a flap (4) hinged at one end, upstream of the juncture of said induction duct and said inlet duct, said flap including a flat undersurface adapted to seat upon said annular seating surface and including another hinge located proximate the middle of said flap, opposite said undersurface for receiving a bar (7) extending from a vacuum operable diaphragm and a detent (21) positioned on said one end and including a cantilevered end extending upstream therefrom; and
    a stop element comprising a flat open square member including two side limbs, of predetermined length joined to a top and a bottom, a center bi-metal leg located between said side limbs and also linking said top and said bottom, said bi-metal leg having a curvature in a direction to engage said cantilevered end of said detent when the temperature of the unheated air is below a predetermined value and a curvature in an opposite sense when the temperature of the unheated air is above said predetermined temperature such that said bi-metal leg is removed from said cantilevered end, said stop element arranged edge-on to the flow of unheated air and extending downwardly within said induction duct to position said bi-metal leg in close proximity to said detent such that when the curvature of said bi-metal leg is in said one direction said bi-metal leg engages said cantilevered end of said detent.

3. The apparatus as defined in claim 2 wherein the length of said bi-metal leg is longer than the length of said side limbs to define the curvature in said one direction.

* * * * *